United States Patent
MacNeille et al.

(10) Patent No.: US 9,459,111 B2
(45) Date of Patent: Oct. 4, 2016

(54) METHODS AND APPARATUS FOR ESTIMATING POWER USAGE

(71) Applicant: FORD GLOBAL TECHNOLOGIES, LLC, Dearborn, MI (US)

(72) Inventors: Perry Robinson MacNeille, Lathrup Village, MI (US); Edward Andrew Pleet, Livonia, MI (US); Mark John Jennings, Saline, MI (US); Oleg Yurievitch Gusikhin, West Bloomfield, MI (US); Brian Petersen, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 13/944,470

(22) Filed: Jul. 17, 2013

(65) Prior Publication Data
US 2013/0304380 A1    Nov. 14, 2013

Related U.S. Application Data

(63) Continuation of application No. 13/207,566, filed on Aug. 11, 2011.

(51) Int. Cl.
*G01C 21/34*    (2006.01)

(52) U.S. Cl.
CPC .................. *G01C 21/3469* (2013.01)

(58) Field of Classification Search
CPC .. G01C 21/3469; G01C 21/34; G01C 21/32; G01C 21/3446; G01C 21/20; G01C 21/3679; G01C 21/3407; G01C 21/3423; G01C 21/3415; G01C 21/3691; G01C 21/36; G01C 21/3484; G01C 21/3617; B60K 6/48; B60K 35/00; B60K 37/06; B60R 16/0236; B63J 99/00; G08B 25/08; G06Q 30/06; G06Q 10/04; G06Q 50/06; B60W 40/09; G07C 5/0816; G01R 11/46; B69R 16/0236; G08G 1/0133

USPC .......... 701/22, 29.5, 36, 117, 533, 428, 532, 701/118, 123; 340/539.11, 540, 984; 705/14.1; 706/62; 703/8
See application file for complete search history.

(56) References Cited

U.S. PATENT DOCUMENTS

| 5,202,617 A | 4/1993 | Nor |
| 5,301,113 A | 4/1994 | To et al. |

(Continued)

FOREIGN PATENT DOCUMENTS

| EP | 2102598 B1 | 1/2013 | |
| WO | WO 2009031021 A2 * | 3/2009 | ........... B60R 16/023 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Yuri Kan
(74) *Attorney, Agent, or Firm* — Jennifer Stec; Brooks Kushman P.C.

(57) ABSTRACT

A computer-implemented method includes establishing a road network model on which a plurality of simulated vehicles may be run. The method also includes setting up a plurality of scenarios under which vehicle driving conditions vary to be run on the road network model. The illustrative method includes receiving energy usage related data for a plurality of simulated vehicles run in at least one of the plurality of scenarios on the road network model. The method further includes calculating a total energy consumption for each of the vehicles. The method additionally includes repeating the receiving and calculating steps to determine how various elements of the road network model and scenarios effect vehicle energy consumption.

17 Claims, 2 Drawing Sheets

(56) References Cited

U.S. PATENT DOCUMENTS

| | | | |
|---|---|---|---|
| 5,539,399 A | 7/1996 | Takahira et al. | |
| 5,686,895 A | 11/1997 | Nakai et al. | |
| 5,790,976 A | 8/1998 | Boll et al. | |
| 5,892,346 A | 4/1999 | Moroto et al. | |
| 5,913,917 A | 6/1999 | Murphy | |
| 5,916,298 A | 6/1999 | Kroiss et al. | |
| 6,198,995 B1 | 3/2001 | Settles et al. | |
| 6,337,621 B1 | 1/2002 | Ogino et al. | |
| 6,587,787 B1 * | 7/2003 | Yokota | G01C 21/36 701/455 |
| 6,591,185 B1 | 7/2003 | Polidi et al. | |
| 6,836,728 B2 | 12/2004 | Shimabara | |
| 6,864,807 B2 | 3/2005 | Todoriki et al. | |
| 6,947,732 B2 | 9/2005 | Fraser | |
| 7,127,350 B2 | 10/2006 | Oikubo | |
| 7,142,664 B2 | 11/2006 | Seligmann | |
| 7,149,623 B2 | 12/2006 | Flick | |
| 7,274,987 B2 * | 9/2007 | Ishiguro | B60R 16/0236 701/113 |
| 7,277,780 B2 | 10/2007 | Meier-Arendt et al. | |
| 7,346,630 B2 | 3/2008 | Eichstaedt et al. | |
| 7,402,978 B2 | 7/2008 | Pryor | |
| 7,433,714 B2 | 10/2008 | Howard et al. | |
| 7,444,384 B2 | 10/2008 | Horvitz | |
| 7,586,956 B1 | 9/2009 | Mishra et al. | |
| 7,668,644 B2 | 2/2010 | Tengler et al. | |
| 7,873,466 B2 | 1/2011 | Kong | |
| 7,925,426 B2 | 4/2011 | Koebler et al. | |
| 8,000,842 B2 | 8/2011 | Yi et al. | |
| 8,005,453 B2 | 8/2011 | Van Bosch et al. | |
| 8,103,434 B2 | 1/2012 | Helbing et al. | |
| 8,239,127 B2 | 8/2012 | Kono et al. | |
| 8,255,152 B2 | 8/2012 | Barth et al. | |
| 8,284,039 B2 | 10/2012 | Baker et al. | |
| 8,290,695 B2 | 10/2012 | Hiestermann et al. | |
| 8,290,701 B2 | 10/2012 | Mason et al. | |
| 8,294,286 B2 | 10/2012 | Hunter | |
| 8,401,792 B2 | 3/2013 | Yeh et al. | |
| 8,478,642 B2 | 7/2013 | Dey et al. | |
| 8,504,236 B2 | 8/2013 | Guo et al. | |
| 2002/0164998 A1 | 11/2002 | Younis | |
| 2003/0023374 A1 | 1/2003 | Shimabara | |
| 2004/0073643 A1 | 4/2004 | Hayes et al. | |
| 2004/0162669 A1 | 8/2004 | Nagamasa | |
| 2004/0243307 A1 | 12/2004 | Geelen | |
| 2005/0080552 A1 | 4/2005 | Feldman et al. | |
| 2006/0002413 A1 | 1/2006 | Tsutazawa et al. | |
| 2006/0007022 A1 | 1/2006 | Endo et al. | |
| 2006/0167601 A1 * | 7/2006 | Henning et al. | 701/30 |
| 2006/0290490 A1 | 12/2006 | Kraus et al. | |
| 2007/0052552 A1 | 3/2007 | Suzuki | |
| 2007/0112475 A1 | 5/2007 | Koebler et al. | |
| 2007/0150171 A1 | 6/2007 | Tengler et al. | |
| 2007/0271035 A1 | 11/2007 | Stoschek et al. | |
| 2008/0027606 A1 | 1/2008 | Helm | |
| 2008/0042489 A1 | 2/2008 | Lewis et al. | |
| 2008/0294330 A1 * | 11/2008 | Sasano | G01C 21/3415 701/117 |
| 2009/0021218 A1 | 1/2009 | Kelty et al. | |
| 2009/0099992 A1 | 4/2009 | Horvitz | |
| 2009/0109022 A1 * | 4/2009 | Gangopadhyay et al. | 340/540 |
| 2009/0110163 A1 | 4/2009 | Gupta | |
| 2009/0119385 A1 | 5/2009 | Horvitz | |
| 2009/0138188 A1 | 5/2009 | Kores et al. | |
| 2009/0141173 A1 | 6/2009 | Pugel | |
| 2009/0265099 A1 | 10/2009 | Gottlieb | |
| 2009/0287408 A1 * | 11/2009 | Gerdes | G01C 21/3423 701/533 |
| 2009/0309709 A1 | 12/2009 | Bevacqua et al. | |
| 2010/0010732 A1 * | 1/2010 | Hartman | G01C 21/3484 701/532 |
| 2010/0017249 A1 | 1/2010 | Fincham et al. | |
| 2010/0060016 A1 | 3/2010 | Hunter | |
| 2010/0070253 A1 | 3/2010 | Hirata et al. | |
| 2010/0094496 A1 | 4/2010 | Hershkovitz et al. | |
| 2010/0106514 A1 | 4/2010 | Cox | |
| 2010/0106603 A1 | 4/2010 | Dey et al. | |
| 2010/0110077 A1 | 5/2010 | Grossman et al. | |
| 2010/0131188 A1 | 5/2010 | Yeh et al. | |
| 2010/0138142 A1 | 6/2010 | Pease | |
| 2010/0169008 A1 | 7/2010 | Niwa et al. | |
| 2010/0207772 A1 | 8/2010 | Yamamoto | |
| 2010/0235076 A1 | 9/2010 | Ofek et al. | |
| 2010/0237985 A1 | 9/2010 | Landau-Holdsworth et al. | |
| 2010/0256830 A1 | 10/2010 | Kressner et al. | |
| 2010/0274689 A1 | 10/2010 | Hammad et al. | |
| 2010/0286909 A1 | 11/2010 | Tate, Jr. et al. | |
| 2011/0040438 A1 | 2/2011 | Kluge et al. | |
| 2011/0060495 A1 | 3/2011 | Kono et al. | |
| 2011/0060517 A1 | 3/2011 | Kono et al. | |
| 2011/0080282 A1 * | 4/2011 | Kleve et al. | 340/539.11 |
| 2011/0095914 A1 * | 4/2011 | Velado | B63J 99/00 340/984 |
| 2011/0125357 A1 * | 5/2011 | Harumoto et al. | 701/22 |
| 2011/0166748 A1 * | 7/2011 | Schneider | B60K 35/00 701/36 |
| 2011/0191265 A1 | 8/2011 | Lowenthal et al. | |
| 2011/0224841 A1 | 9/2011 | Profitt-Brown et al. | |
| 2011/0224852 A1 | 9/2011 | Profitt-Brown et al. | |
| 2011/0225105 A1 | 9/2011 | Scholer et al. | |
| 2011/0238457 A1 | 9/2011 | Mason et al. | |
| 2011/0251789 A1 | 10/2011 | Sanders et al. | |
| 2011/0307166 A1 | 12/2011 | Hiestermann et al. | |
| 2011/0309926 A1 | 12/2011 | Eikelenberg et al. | |
| 2012/0016551 A1 | 1/2012 | Krause et al. | |
| 2012/0016576 A1 | 1/2012 | Huang et al. | |
| 2012/0022904 A1 | 1/2012 | Mason et al. | |
| 2012/0029800 A1 * | 2/2012 | Kluge et al. | 701/117 |
| 2012/0065831 A1 | 3/2012 | Ross et al. | |
| 2012/0072096 A1 * | 3/2012 | Chapman | G08G 1/0133 701/118 |
| 2012/0158299 A1 | 6/2012 | Cerecke et al. | |
| 2012/0179315 A1 | 7/2012 | Tate et al. | |
| 2012/0179362 A1 | 7/2012 | Stille | |
| 2012/0209579 A1 * | 8/2012 | Fansler | G06Q 10/04 703/8 |
| 2012/0232783 A1 | 9/2012 | Calkins et al. | |
| 2012/0271542 A1 | 10/2012 | Arcot et al. | |

FOREIGN PATENT DOCUMENTS

| | | |
|---|---|---|
| WO | 2011035427 | 3/2011 |
| WO | 2011035427 A1 | 3/2011 |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

News Release, "Chevrolet and OnStar Give Volt Owners 24/7 Connection and Control via Wireless Smartphone Application", released Jan. 5, 2010.

Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-control/, Dec. 30, 2010.

GM Onstar Mobile Demonstration Capability for Volt img. retrieved from: Hayes, JW, "GM OnStar App for Chevy Volt". Auto

(56) References Cited

OTHER PUBLICATIONS and Racing News, Jan. 6, 2010. <http://autoandracingnews.wordpress.com/2010/01/06/gm-onstar-app-for-chevy-volt/>.
BlackBerry Curve Series, BlackBerry Curve 9300/9330—Smartphones User Guide, Version: 6.0 (2011), pp. 144.
BlackBerry Curve Series, BlackBerry Curve 9300/9330—Smartphones User Guide, Version: 6.0 (2011).
ACDelco, TechConnect, Battery Killers Common Causes of Battery Failure, Jan. & Feb. 2012, pp. 1-8.
Ford Motor Company, "SYNC," Owner's Guide Supplement, SYNC System Version 1 (Nov. 2007).
Kermit Whitfield, "A hitchhiker's guide to the telematics ecosystem", Automotive Design & Production, Oct. 2003, http://findarticles.com, pp. 1-3.

* cited by examiner

METHODS AND APPARATUS FOR ESTIMATING POWER USAGE

CROSS-REFERENCE TO RELATED APPLICATIONS

This application is a continuation of U.S. application Ser. No. 13/207,566 filed Aug. 11, 2011, the disclosure of which is incorporated in its entirety by reference herein.

TECHNICAL FIELD

The illustrative embodiments generally relate to methods and apparatus for estimating power usage.

BACKGROUND

Evaluating real world fuel consumption of a vehicle is useful in developing algorithms for low cost routing and distance-to-empty. This calculation enables vehicle features that can result in significant fuel and travel time savings. With advances in digital systems, there is an explosion of inputs available to electronic vehicle features that can influence emissions, energy consumption and travel time.

Traffic simulation tools help in replicating real life traffic and driver behavior. Different scenarios can be analyzed to understand vehicle behavior under varying conditions.

Marketing studies have revealed that range anxiety is the number one concern for battery electric vehicle (BEV) owners. The illustrative embodiments enable vehicle features that can eliminate range anxiety by presenting real-world estimates of distance to empty and also ensure the best fuel economy by presenting low energy routes.

SUMMARY

In a first illustrative embodiment, a computer-implemented method includes establishing a road network model on which a plurality of simulated vehicles may be run. The illustrative method also includes setting up a plurality of scenarios under which vehicle driving conditions vary to be run on the road network model.

Also, the illustrative method includes receiving energy usage related data for a plurality of simulated vehicles run in at least one of the plurality of scenarios on the road network model. The illustrative method further includes calculating a total energy consumption for each of the vehicles.

The illustrative method additionally includes repeating the receiving and calculating steps to determine how various elements of the road network model and scenarios effect vehicle energy consumption.

In a second illustrative embodiment, a computer implemented method includes breaking a route into a plurality of segments having the same or a similar energy use affecting characteristic. This illustrative method also includes assigning a total energy usage cost to the segment based on one or more energy use affecting characteristics of each segment.

Further, this illustrative method includes adding the total energy usage cost of all segments comprising a route to determine a total route energy cost and repeating the adding step for a plurality of routes comprised of varying segments between a current location and a destination. This illustrative method additionally includes presenting a driver with the route having the lowest total route energy cost.

In a third illustrative embodiment, a machine readable storage medium stores instructions that, when executed, cause a processor to perform the method including establishing a road network model on which a plurality of simulated vehicles may be run. The exemplary method also includes setting up a plurality of scenarios under which vehicle driving conditions vary to be run on the road network model.

Further, the illustrative method includes receiving energy usage related data for a plurality of simulated vehicles run in at least one of the plurality of scenarios on the road network model and calculating a total energy consumption for each of the vehicles. Also, the illustrative method includes repeating the receiving and calculating steps to determine how various elements of the road network model and scenarios effect vehicle energy consumption.

DETAILED DESCRIPTION

Figure 1:
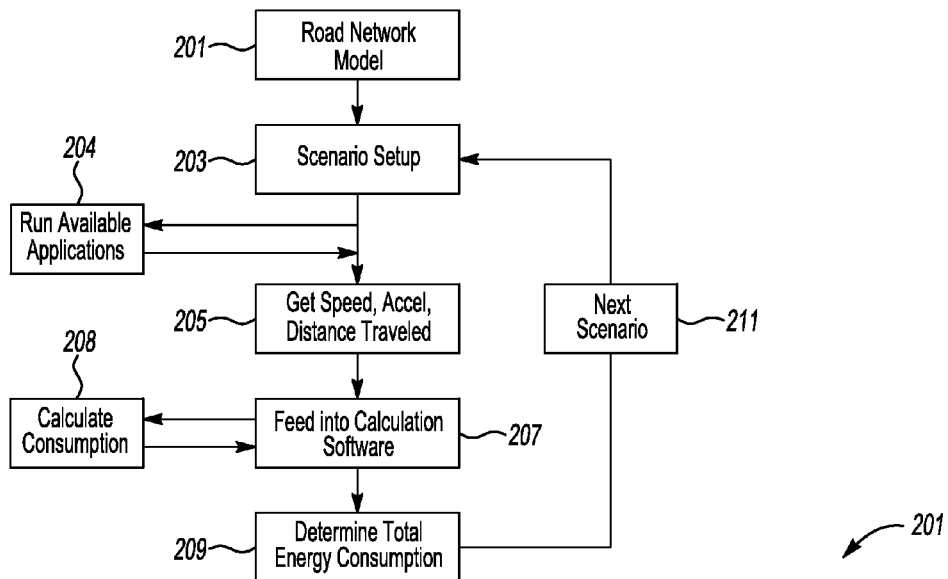
FIG. 1 shows an illustrative example of a fuel efficiency testing process.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Evaluating the real world fuel consumption of a vehicle is one method of developing algorithms for low-cost routing and distance-to-empty. This calculation enables vehicle features that can result in significant fuel and travel time savings. With advances in digital systems, there is an explosion of inputs available to electronic vehicle features that can influence emissions, energy consumption and travel time. Making use of this data will eventually result in cost savings for a consumer.

Traffic simulation tools help in replicating real life traffic and driver behavior. Different scenarios can be analyzed to understand the most important influencers on real world fuel economy. The energy consumption under different traffic and road conditions can also be evaluated using traffic simulation.

The illustrative embodiment reflect development of software modules for embedded and cloud-based applications that receives inputs such as driver characteristics, road topology, vehicle characteristics, weather, traffic, etc., and output energy consumption for route optimization and distance to empty computations. This can also enable applications on embedded platforms such as SYNC, mobile platforms such as smart phones and in web-based applications in the cloud.

The illustrative embodiments enable vehicle features that can eliminate range anxiety by presenting real-world estimates of distance to empty and also ensure the best fuel economy by presenting low energy routes.

The illustrative embodiments include a laboratory method of computing real-world fuel consumption from external data available in digital formats. The external data available in digital formats is used as an input into a traffic simulator called VISSIM2, which can generate realistic drive cycles. Drive cycles are then input into a powertrain simulation to compute energy along a specific route for a specific vehicle. The energies for the entire set of vehicles are statistically analyzed for average energy consumption and the expectation interval energy consumption along the route.

A method of computing energy from drive cycles called modeFrontier is introduced and makes the energy consumption analysis much simpler and more suitable for embedded processors and cloud-based applications. Four dimensional energy tables are populated with energy values using CVSP, with the dimensions being vehicle weight, speed, road gradient and accessory loads. Actual road gradient and vehicle acceleration from the VISSIM drive cycle are combined into a singled variable for use in the tables. Throughout any simulated drive only the speed and vehicle acceleration vary, so the table was divided into sub-tables for each accessory load and vehicle weight. A cubic spline surface was created in the speed and road gradient dimensions for each sub-table to more accurately estimate the fuel consumption.

sCVSP was also used to compute the maximum acceleration the vehicle is capable of at a specific weight, road gradient and speed. This was passed into VISSIM manually as an acceleration-velocity curve. If this curve was incorrect the accelerations would be either too large for the vehicle to achieve or never large enough to represent maximum vehicle acceleration.

VISSIM is a simulation package that can analyze private and public transport operations under constraints such as lane configuration, traffic composition, traffic signals, public transportation stops, etc., thus making it a useful tool for the evaluation of various alternatives based on transportation engineering and planning measures of effectiveness.

VISSIM can be applied as a useful tool in a variety of transportation problem settings. The following list provides a selective overview of previous applications of VISSIM:
a. Development, evaluation and fine-tuning of signal priority logic;
b. Evaluation and optimization of traffic operations in a combined network of coordinated and actuated traffic signals;
c. Feasibility and traffic impact studies of integrating light rail into urban street networks;
d. Analysis of slow speed weaving and merging areas;
e. Easy comparison of design alternatives including signalized and stop sign controlled intersections, roundabouts and grade separated interchanges;
f. Capacity and operations analysis of complex station layouts for light rail and bus systems;
g. With its built-in Dynamic Assignment model, VISSIM can answer route choice dependent questions such as the impacts of variable message signs or the potential for traffic diversion into neighborhoods for networks up to the size of medium sized cities; and
h. Modeling and simulating flows of pedestrians—in streets and buildings—allow for a wide range of new applications. VISSIM can also simulate and visualize the interactions between road traffic and pedestrians.

The traffic simulator is a microscopic traffic flow simulation model including the car following and lane change logic. The signal state generator is a signal control software pooling detector information from the traffic simulator on a discrete time step basis (down to $1/10$ of a second). It then determines the signal status for the following time step and returns this information to the traffic simulator.

The accuracy of a traffic simulation model is mainly dependent on the quality of the vehicle modeling, e.g., the methodology of moving vehicles through the network. In contrast to less complex models using constant speeds and deterministic car following logic, VISSIM uses the psycho-physical driver behavior model developed by WIEDE-MANN4. The basic concept of this model is that the driver of a faster moving vehicle starts to decelerate as he reaches his individual perception threshold when approaching a slower moving vehicle. Since he cannot precisely determine the speed of the other vehicle, his speed will fall below that vehicle's speed until he starts to slightly accelerate again after reaching another perception threshold. This results in an iterative process of acceleration and deceleration.

Stochastic distributions of speed and spacing thresholds replicate individual driver behavior characteristics. VISSIM's traffic simulator not only allows drivers on multiple lane roadways to react to preceding vehicles (4 by default), but also neighboring vehicles on the adjacent travel lanes are taken into account. The alertness of drivers approaching a traffic signal is increased within 100 meters of a stop line.

Some of the VISSIM model inputs are listed below:
a. Behavior of the driver-vehicle-unit;
b. Psycho-physical sensitivity thresholds;
c. Ability to estimate distance;
d. Aggressiveness;
e. Memory of the driver;
f. Actual acceleration/deceleration based on current speed and desired speed and aggressiveness;
g. Accessory usage based on weather, daylight and driver preferences;
h. Interdependence of driver-vehicle units;
i. Rules to define relationships between leading and following vehicles;
j. Rules to define the relationship between vehicles in adjacent travel lanes;
k. Rules to define behavior at intersections and traffic signals;
l. Actual speed and acceleration;
m. Behavior of driver-vehicle units with respect to the road;
n. Speed limits;
o. Number of lanes;
p. Behavior of driver-vehicle units with respect to traffic;
q. Road model with speed limits, lanes, and gradient;
r. Volume of vehicles in the road model;
s. Distribution of vehicle lengths, top speeds and maximum acceleration; and
t. Traffic control devices, timing, etc.

The ability of the simulator to depict real life traffic scenarios and driving behavior is extremely useful in understanding the different road or traffic or driver characteristics that affect the energy consumption of a battery electric vehicle.

sCVSP is the corporate standard tool for vehicle performance and fuel economy modeling and simulation. Among its main features are:
a. Used on Ford vehicle programs to set Performance & Fuel Economy targets;
b. Model architecture and subsystem interfaces allow interchange subsystem and component models based on vehicle hardware. A global bus enables the communication between the vehicle system control (VSC) and vehicle components;

c. Includes extensive set of component models that have been developed over the years and are validated with test data;
d. Includes extensive vehicle and component parameter database. These parameters can be calibrated and optimized to improve vehicle performance;
e. Supported by company-wide processes to generate vehicle and component parameter data for new programs;
f. Includes standard test management and report generating capabilities that allow design engineers understand the behavior of components, subsystems and the vehicle;
g. Features and capabilities can be extended by users;
h. New models can be added to existing libraries; and
i. New libraries with new models can be added;

In order to have an on-line capability to predict the distance to empty in BEVs, sCVSP energy usage results are computed in advance and recorded in a table as shown below. Each entry in the table is the work needed for locomotion in Wh/mile for a given speed, acceleration, ground grade, accessory load and vehicle weight. The vehicle weight was simplified and parameterized by the number of passengers in the vehicle assuming 150 lbs for a passenger. The work is provided at the battery terminals as well as at the wheels The former value includes parasitic losses in the powertrain but not parasitic losses in the battery.

In the calculation the large table is reduced to separate 2-dimensional sub-tables for a specific accLoad and number of passengers. The sub-tables have two variables remaining, % grade and VehSpeed, that are the only variables that change during a single drive cycle. The sub-tables are further reduced to a cubic spline surface dimensioned by % grade and vehicle speed. The values computed by sCVSP become the corner nodes for each value in the table. These cubic-spline surfaces are then used to estimate the power from the drive cycle, with vehicle acceleration and actual road grade combined into the single % grade value.

FIG. 1 shows an illustrative example of a fuel efficiency testing process. In this illustrative embodiment, a road network model is first established 201. In at least one example, the model is established in a VISSIM environment.

Next, a plurality of scenarios is setup under which testing conditions can be performed on the road model 203. Multiple replications of the scenarios are run to establish baseline results 204, providing aggregate data with a high degree of accuracy.

For each relevant virtual vehicle in a given scenario, speed, acceleration, distance traveled, etc., are obtained 205, and this data is fed into calculation software 207. Fuel consumption for that vehicle is then calculated based on the inputs 208. From this data, total energy consumption can then be determined 209.

After a given scenario is completed, the process can advance to a next scenario 211.

Figure 2:
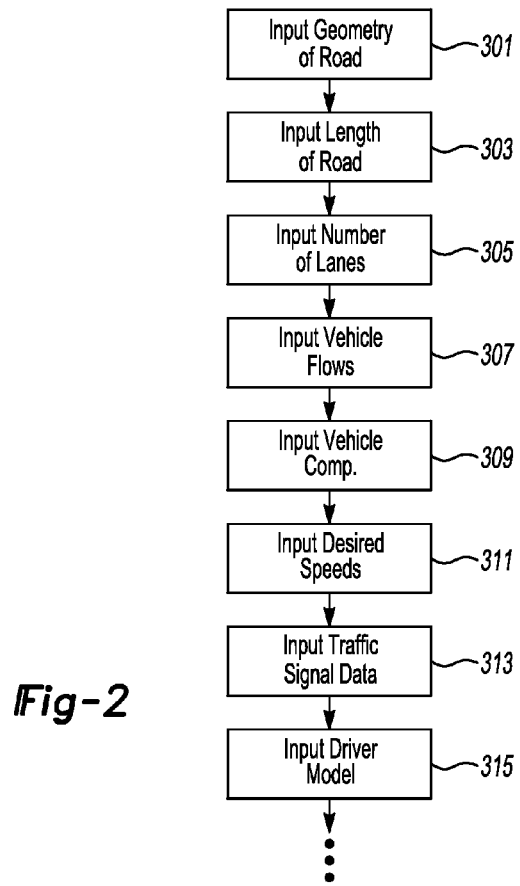
FIG. 2 shows an illustrative example of a road network modeling process.

FIG. 2 shows an illustrative example of a road network modeling process. The road network under consideration is set-up in the traffic simulator. The geometry 301 and length of the road 303, number of lanes 305, vehicle flows 307, vehicle compositions 309, desired speeds 311, traffic signal data 313, the driver model 315, etc. are some of the inputs that may need to be set-up before running the simulation. Additional inputs may be added to the simulator as desired, and not all of the previously mentioned inputs need to be used.

Figure 3:
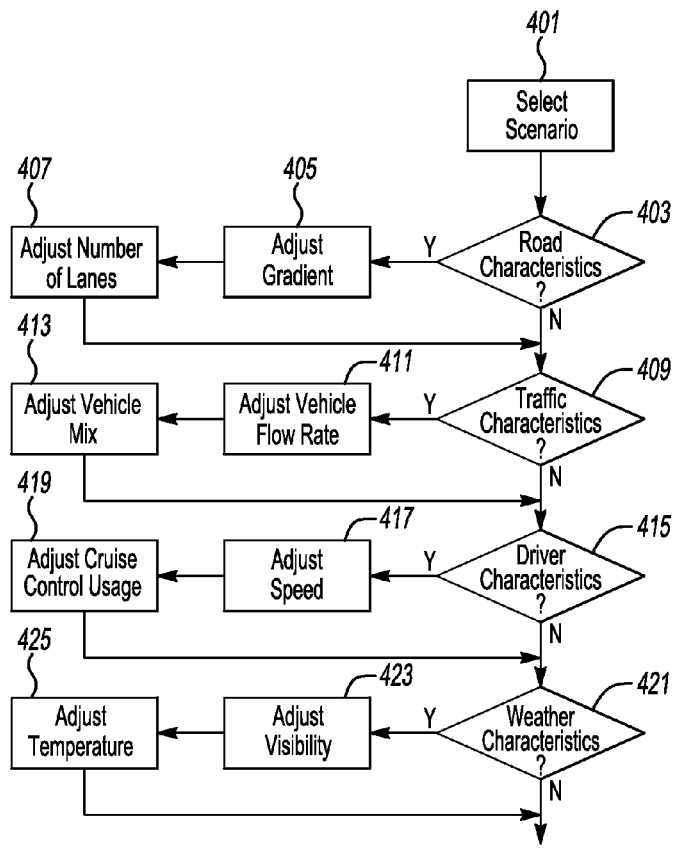
FIG. 3 shows an illustrative example of a scenario setup process.

FIG. 3 shows an illustrative example of a scenario setup process. In this illustrative example, a particular scenario is selected for initialization 401. Road characteristics may be input 403 if desired. For example, without limitation, gradient 405 and/or number of lanes 407 may be adjusted.

Also, in this embodiment, traffic characteristics 409 may be input for the scenario. This may include, but are not limited to, a vehicle flow rate 411 and a vehicle mix 413.

Further, in this illustrative embodiment, driver characteristics may be input 415 to represent certain driving behav-

| tacc_load_Wat | grade_perc | speed_kph | batt_whr | batt_whr | batt_whr | batt_whr | whl_whr | whl_whr | whl_whr | whl_whr |
|---|---|---|---|---|---|---|---|---|---|---|
| 400.000 | −6.00 | 10.0 | −212.72 | −225.22 | −237.70 | −250.20 | −376.63 | −392.66 | −408.67 | −424.70 |
| 400.000 | −6.00 | 30.0 | −288.43 | −302.73 | −317.01 | −331.31 | −354.00 | −369.90 | −385.78 | −401.68 |
| 400.000 | −6.00 | 50.0 | −273.35 | −287.92 | −302.46 | −317.01 | −318.89 | −334.68 | −350.45 | −366.23 |
| 400.000 | −6.00 | 70.0 | −234.25 | −248.99 | −263.60 | −278.22 | −270.65 | −286.35 | −302.01 | −317.68 |
| 400.000 | −6.00 | 90.0 | −177.01 | −191.77 | −206.49 | −221.23 | −208.58 | −224.18 | −239.75 | −255.34 |
| 400.000 | −6.00 | 110.0 | −104.60 | −119.24 | −133.85 | −148.47 | −133.27 | −148.79 | −164.27 | −179.77 |
| 400.000 | −6.00 | 130.0 | −19.74 | −34.20 | −48.60 | −63.02 | −44.44 | −59.90 | −75.31 | −90.74 |
| 400.000 | −4.00 | 10.0 | −96.92 | −104.94 | −112.94 | −120.95 | −229.18 | −239.28 | −249.35 | −259.44 |
| 400.000 | −4.00 | 30.0 | −154.64 | −163.76 | −172.86 | −181.97 | −206.56 | −216.53 | −226.47 | −236.44 |
| 400.000 | −4.00 | 50.0 | −136.31 | −145.50 | −154.66 | −163.83 | −171.46 | −181.32 | −191.15 | −200.99 |
| 400.000 | −4.00 | 70.0 | −95.61 | −104.78 | −113.93 | −123.09 | −123.23 | −132.99 | −142.71 | −152.46 |
| 400.000 | −4.00 | 90.0 | −37.60 | −46.74 | −55.85 | −64.97 | −61.17 | −70.84 | −80.47 | −90.12 |
| 400.000 | −4.00 | 110.0 | 36.10 | 25.94 | 16.41 | 7.38 | 14.14 | 4.55 | −5.00 | −14.56 |
| 400.000 | −4.00 | 130.0 | 131.83 | 121.66 | 111.53 | 101.38 | 102.95 | 93.43 | 83.95 | 74.46 |
| 400.000 | −2.00 | 10.0 | 20.48 | 17.19 | 13.92 | 10.63 | −81.38 | −85.52 | −89.64 | −93.78 |
| 400.000 | −2.00 | 30.0 | −19.47 | −23.15 | −26.80 | −30.47 | −58.77 | −62.78 | −66.78 | −70.79 | sCVSP was also used to compute the maximum acceleration verses time as an input into VISSIM. sCVSP simulations of the three EPA cycles demonstrate the extremes of maximum accelerations imposed by the sCVSP model of the vehicle. It is necessary that VISSIM and sCVSP have the same acceleration limits or VISSIM will generate accelerations that cannot be achieved by the vehicle. The lower bound of acceleration (maximum deceleration) was −0.85 at zero mph, varying linearly to −0.75 at 80 mph; theoretically it may be possible to have greater decelerations.

iors. These characteristics may include, but are not limited to, driver speeds 417 and cruise control usage data 419.

Also, in this example, weather data may be input for the scenario 421. This data may include, but is not limited to, visibility adjustments 423 and temperature adjustments 425.

Figure 4:
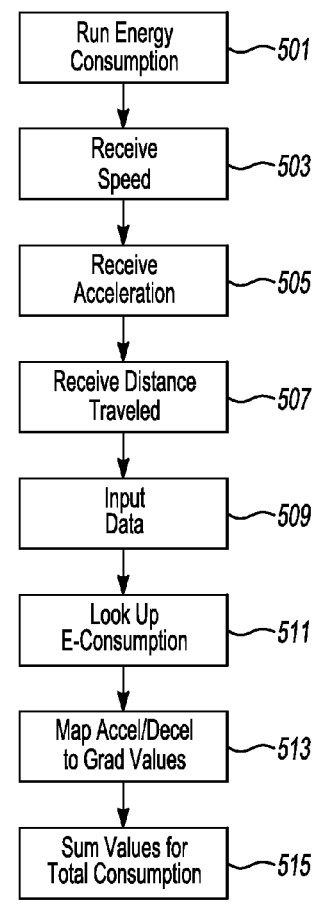
FIG. 4 shows an illustrative example of an energy consumption determination process.

FIG. 4 shows an illustrative example of an energy consumption determination process.

The parameters used to calculate the energy consumed by a particular battery electric vehicle during a simulation run may include: speed 503, acceleration 505, distance travelled 507, accessory loads and number of passengers. VISSIM can output the speed, acceleration and distance travelled by all the vehicles in the simulation at every instant (every second in this case). The number of passengers is fixed at one and the accessory loads are assumed to remain fixed throughout the simulation run. It should be noted that the accessory loads affect only the eventual energy consumption and not the drive cycle.

Using the energy tables from sCVSP the outputs from VISSIM are processed in MATLAB (or C-code on board the vehicle) 509 to get the energy consumption by the battery electric vehicles in a given scenario 511. The acceleration/deceleration values from VISSIM are mapped into corresponding gradient values and thereby taking into account the regenerative ability of a battery electric vehicle during braking 513. A MATLAB/C code calculates the energy consumed at each and every time instant for each electric vehicle and sums them to give the total energy consumption 515. Regenerative capability of a battery electric vehicle is considered in the energy tables.

The models used by the traffic simulator are stochastic in nature. Hence, for a given scenario and a particular simulation run, each of the battery electric vehicles will have a different drive cycle and therefore different energy usage. A characteristic of a particular simulation is the statistical variance of the energy utilization of large samples of vehicle. The sample size can be determined by plotting the variance (or standard deviation) verses sample size and observing the point at which the variance approaches a steady state. Based this analysis 120 vehicles was selected as a reasonable sample size.

It was observed that, in this example, variation in standard deviation is negligible once the sample size is more than 120. Hence, averaging the energy values of 120 vehicles for each scenario would provide good statistics. In order to get a sample size of at least 120 vehicles, the simulation needs to be run multiple times depending on the scenario being tested. For example, assuming the flow to be 2000 vehicle per hour with 2% battery electric vehicles and a simulation time of one hour, at least 4 simulation runs need to be performed to get a good sample of 120 vehicles. It should be noted that in a particular run, only those vehicles are chosen which traverse the whole road length. Vehicles which are unable to complete the whole trip are excluded from the energy calculations.

Presenting the mean energy consumed in a given scenario is not enough. It is important to know the variation in the values. Hence, the mean energy values are associated with a 'confidence interval'. A confidence interval is a range of numbers relevant to the parameter of interest. For example, a 95% confidence interval means that if we repeatedly draw samples of a given size N from a certain population and we construct a confidence interval for each sample, then 95% of these intervals on average will contain the true value of the unknown parameter as an interior point. It is incorrect to interpret a 95% confidence interval to mean that there is a 95% chance that the interval contains the true value of the unknown parameter as an interior point. This is because there is one value of the unknown parameter, and the confidence interval either contains this value or does not contain it.

Thus, confidence intervals should not be interpreted as probabilities but should rather be interpreted in the context of repeated sampling.

Through testing, it can be seen that gradient has a prominent effect on the energy consumption of a battery electric vehicle. There is a rapid increase in the energy values as we move from a gradient of −4% to 4%. This is because, the vehicle needs more energy to climb uphill (positive gradient) and it can gain energy through regenerative braking while going downhill (negative gradient). Relatively, congestion doesn't seem to have a big effect on the energy usage.

There is a slight reduction in energy as the flow conditions approach a congested scenario. This effect is directly related to the decrease in the speeds for congested flows.

Also, speed of the vehicles has a big impact on the energy consumption. A vehicle travelling at around 100 km/hr will consume about 30% more energy than a vehicle travelling at around 80 km/hr. Also, the number of lanes on the freeway doesn't seem to have an effect on the overall energy consumption.

It can be seen that the vehicles travelling in cruise control use significantly lower energy than the vehicles travelling without cruise. The fluctuations in acceleration/deceleration and hence the speed results in higher energy consumption for vehicles which are not using cruise control. The drop in energy consumption with increase in flow values is directly related to the drop in speeds as the flow conditions become congested. It should also be noted that the energy consumption and its variation remains fixed across different flow values when the cruise control is set to 80 km/hr. But, in the case of cruise control at 100 km/hr, there is a larger statistical variance in energy usage (dotted lines diverge) as the flow values increase. This is because at high flows, the vehicles are unable to maintain a cruise speed of 100 km/hr due to the increase in flow density. But, the vehicles seem to maintain a cruise speed of 80 km/hr even when the traffic flow increases.

The effect of accessory loads is comparable to the effect of flow conditions. For example, a vehicle travelling in a congested road (6000 vehicles per hour) and a hot weather (2000 W accessory load) uses almost the same energy as that used by a vehicle travelling in free flow (2000 vehicles per hour) and a cold weather (800 W accessory load).

For a given accessory load the energy usage is the lowest for a residential road and highest for a freeway, mainly because of low speeds and stop-go nature of traffic on a residential road.

In fact, the energy usage per mile with 400 W accessory load is more than halved from a freeway to a residential road. But, the travel time on a residential road is almost four times that on a freeway. This shows a trade-off between travel times and energy usage. Increase in the accessory loads has very little impact on the energy usage on a freeway where high speed is the primary driver of energy consumed. On the other hand, the accessory loads drastically affect the energy usage on a residential road to such an extent that, the energy used per mile with 2000 W accessory load is almost the same as that on an urban road.

The energy consumption results from various scenarios across different road types have been analyzed to understand the various factors that affect energy consumption of a battery electric vehicle. The results show that road gradient has a very significant effect on the energy usage across all the three road types—freeway, urban roads and residential roads. Accessory loads have a strong effect across different road types. The results show that at very high accessory loads the energy usage on a residential road is equal to the energy used on an urban road, although there is a difference in the desired speeds on these road types.

The speed of the vehicles also has a prominent effect on the energy usage. Cruise control on freeways helps in reducing the energy cost. Also, significant energy gains are possible in stop-go traffic scenarios because of regenerative braking in a battery electric vehicle. Hence, urban roads with traffic signals and residential roads are likely to be preferred over freeways to achieve lower energy consumption. But, it should be noted that there is a trade-off here, between energy consumed and travel times.

The results can be used to develop cost functions that can evaluate the total energy consumed along various possible routes between an origin and destination and finally give the customer the minimum energy route. One way of using the results in the cost function is through the use of energy look-up tables and polynomial curve fitting. For example, any route can be broken up into segments which have the same characteristic, (either road type or gradient or speed limits, etc.) and each segment can be assigned a cost which is equal to the energy consumed by the vehicle to travel that segment. Adding up the costs across all the segments will give the overall cost to travel that particular route. This can be done for all possible routes between two locations and the final output could be the route which uses the lowest amount of energy. Energies on different segments can be calculated by fitting a polynomial curve to available data.

Accessory loads can be related to the weather and temperature conditions. Hence, overall, accessory loads will have a significant effect in deciding which road type to choose while making a certain trip.

There is hardly any change in the energy consumption of a battery electric vehicle when the % of heavy goods vehicles is increase from 4% to 10%. A significant change in energy consumption 'might' occur when the % of heavy goods vehicles is increased to an even higher value.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented routing method comprising:
by at least one processor at a server,
receiving, via a web-based application executing on a computer in communication with the server, a route origin and a route destination,
identifying alternative routes between the route origin and route destination;
in response to identified alternative routes between the route origin and route destination, segmenting each of the identified alternative routes based on at least one of a different road, road type and speed limit;
calculating an estimated monetary fuel consumption cost for each of the alternative routes based on a calculated cost for each segment in an alternative route and a fuel economy target for a specific vehicle, and
outputting for display at the computer, via the web-based application, the estimated monetary fuel consumption costs together with the alternative routes.

2. The computer-implemented routing method of claim 1 further comprising identifying one of the alternative routes as a minimum energy route based on the estimated monetary fuel consumption costs.

3. The computer-implemented routing method of claim 1 further comprising outputting for display segments for at least one of the alternative routes.

4. The computer-implemented routing method of claim 1 further comprising, outputting for display traffic operations, speed limit, number of lanes, or road gradient for at least one of the alternative routes.

5. A computer system comprising:
a processor in an embedded platform configured to
receive input for a specific vehicle including a route origin and a route destination,
receive at least one vehicle characteristic including fuel economy for the specific vehicle,
identify alternative routes between the route origin and route destination,
segment each of the identified alternative routes based on at least one of a different road, road type and speed limit,
calculate a monetary energy consumption cost for each of the alternative routes based on each segment and the vehicle characteristics, and
output for display the monetary energy consumption costs together with the alternative routes.

6. The computer system of claim 5 wherein the embedded platform is a vehicle system.

7. The computer system of claim 5 wherein the processor is further configured to enable a web-based application to receive the origin, destination and at least one vehicle characteristic.

8. The computer system of claim 5 wherein the processor is further configured to enable a web-based application to display the monetary energy consumption costs with the alternative routes.

9. The computer system of claim 5 wherein the processor is further configured to output for display the segments for at least one of the alternative routes.

10. The computer system of claim 5 wherein the monetary energy consumption costs are a monetary value associated with energy consumption of a battery or fuel consumption of an engine.

11. A non-transitory computer readable storage medium storing instructions that, when executed by a processor, cause the processor to
in response to a route origin and a route destination, identify alternative routes sharing a segment between the route origin and route destination;
calculate an estimated fuel consumption cost for each of the alternative routes based on fuel economy targets for a specific vehicle; and
display the estimated fuel consumption costs together with the alternative routes.

12. The non-transitory computer readable storage medium of claim 11 wherein the instructions, when executed by the processor, further cause the processor to identify one of the alternative routes as a minimum energy route based on the estimated fuel consumption costs.

13. The non-transitory computer readable storage medium of claim 11 wherein the instructions, when executed by the processor, further cause the processor to segment at least one of the identified alternative routes.

14. The non-transitory computer readable storage medium of claim 11 wherein the instructions, when executed by the processor, further cause the processor to output for display the segments for at least one of the alternative routes.

15. The non-transitory computer readable storage medium of claim 11 wherein the instructions, when executed by the processor, further cause the processor to output for display traffic operations, speed limit, number of lanes, or road gradient for at least one of the alternative routes.

16. The non-transitory computer readable storage medium of claim 11 wherein the instructions, when executed by the processor, further cause the processor to enable a web-based application to receive the origin, destination and fuel economy targets for the vehicle.

17. The non-transitory computer readable storage medium of claim 11 wherein the instructions, when executed by the processor, further cause the processor to enable a web-based application to display the estimated fuel consumption costs with the alternative routes.

\* \* \* \* \*